(12) United States Patent
Hotaka et al.

(10) Patent No.: US 6,932,130 B2
(45) Date of Patent: Aug. 23, 2005

(54) TIRE WHEEL ASSEMBLY

(75) Inventors: Takeshi Hotaka, Hiratsuka (JP);
Yasuhiro Ishikawa, Hiratsuka (JP);
Osamu Ozawa, Hiratsuka (JP);
Ryotaro Suefuji, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/969,975

(22) Filed: Oct. 22, 2004

(65) Prior Publication Data

US 2005/0051248 A1 Mar. 10, 2005

(51) Int. Cl.[7] .......................... B60C 17/04; B60C 17/06
(52) U.S. Cl. .................. 152/156; 152/158; 152/520
(58) Field of Search ................. 152/156, 158, 152/520, 516

(56) References Cited

U.S. PATENT DOCUMENTS

| 6,463,974 | B1 | * | 10/2002 | Hellweg et al. | ........ 152/520 X |
|---|---|---|---|---|---|
| 6,463,976 | B1 | * | 10/2002 | Glinz et al. | ................. 152/520 |
| 6,672,349 | B1 | * | 1/2004 | Glinz et al. | ................. 152/156 |
| 6,705,368 | B2 | * | 3/2004 | Glinz et al. | ............. 152/516 X |
| 6,840,294 | B2 | * | 1/2005 | Kuramori et al. | ........... 152/156 |
| 6,843,288 | B2 | * | 1/2005 | Seko et al. | .................. 152/156 |
| 6,843,289 | B2 | * | 1/2005 | Shimura et al. | ............ 152/156 |

FOREIGN PATENT DOCUMENTS

| JP | 10-297226 A1 | 11/1998 |
|---|---|---|
| JP | 2001-519279 A1 | 10/2001 |

* cited by examiner

*Primary Examiner*—Adrienne C. Johnstone
(74) *Attorney, Agent, or Firm*—Rader, Fishman & Grauer PLLC

(57) ABSTRACT

A run flat tire wheel assembly having a flat run support formed by a ring-shaped metal shell and rubbery elastic members in a tire rim cavity, said tire wheel assembly improving bondability between the ring-shaped metal shell and rubbery elastic members by making said rubbery elastic member from a rubber composition including 100 parts by weight of a diene-based rubber, 40 to 90 parts by weight of carbon black, 3 to 8 parts by weight of sulfur, 0.1 to 1 part by weight of an organic acid cobalt salt in terms of content of cobalt element, 0.1 to 3 parts by weight of a phenylene-diamine-based antiaging agent, and 1 to 6 parts by weight of a resol-type alkylphenol resin.

4 Claims, 3 Drawing Sheets

TIRE WHEEL ASSEMBLY

BACKGROUND OF THE INVENTION

1. Field of the Invention

The present invention relates to a tire wheel assembly used for a pneumatic tire enabling limited operation in a damaged or flat state (hereinafter referred to as a "run flat tire"). More specifically, it relates to a tire wheel assembly capable of improving the bondability of the contact parts of a ring-shaped metal shell and the rubbery elastic members of a run flat support composed of the ring-shaped metal shell and the rubbery elastic members provided in a tire rim cavity.

2. Description of the Related Art

There is a need for a run flat tire having an emergency running ability capable of running for a certain distance even when the pneumatic tire rapidly drops in the internal pressure due to a flat, blowout, etc. during operation of an automobile. Numerous proposals have been made to meet these needs. As such proposals, for example, Japanese Unexamined Patent Publication (Kokai) No. 10-297226 and Japanese Unexamined Patent Publication (Kokai) No. 2001-519279 propose technology enabling run flat running by attaching a run flat support (i.e., core member) on the rim of the cavity of the pneumatic tire and using this to support a flat etc. pneumatic tire.

This run flat support has a ring-shaped member using its outer circumference as a support surface, attaches elastic rings at the two legs, and has the support supported on the rim through the elastic rings. The technology using a run flat support does not make any particular modifications to the wheel/rim of conventional general pneumatic tires and enables the wheel/rim to be used as they are, and therefore, there is the advantage that the production, processing, and attachment facilities for conventional pneumatic tires can be used as they are.

As opposed to this, as a classical method, there is also the technology of reinforcing the side walls to enable run flat running, but this has the problem that sufficient performance cannot be manifested at tire sizes of a high tire sectional height. Further, as technology providing a core member in the cavity of the tire explained above, there is technology making the core solid, but this has the problem of making assembly difficult since the core lacks flexibility. Further, there are also proposals using special rim structures and special tire structures, but these lack general applicability for both tires and wheels, and therefore, have the problem of placing an excessive burden on the users.

On the other hand, the technology using the above run flat support is superior in general applicability and assembling ability, but the bonding strength of the contact surfaces of the elastic rings and ring-shaped member has a great effect on the durability of the run flat support and greatly governs the durability. Therefore, to improve the durability of the run flat support in a tire wheel assembly mounting a run flat support and extend the run flat running distance, it is necessary to improve the bondability of the metal shell surface and rubbery elastic members of the support.

SUMMARY OF THE INVENTION

Accordingly, the object of the present invention is to improve the bondability between the ring-shaped metal shell and the rubbery elastic members forming the run flat support of a run flat tire wheel assembly and to improve the durability of the run flat support and the run flat running characteristics.

In accordance with the present invention, there is provided a run flat tire wheel assembly having a flat run support formed by a ring-shaped metal shell and rubbery elastic members in a tire/rim cavity, wherein the bonding between the ring-shaped metal shell and the rubbery elastic members of the tire wheel assembly is improved by the rubbery elastic members composed of a rubber composition comprising 100 parts by weight of a diene-based rubber, 40 to 90 parts by weight of carbon black, 3 to 8 parts by weight of sulfur, 0.1 to 1 part by weight of an organic acid cobalt salt in terms of content of a cobalt element, 0.1 to 3 parts by weight of a phenylene diamine-based antioxidant and 1 to 6 parts by weight of a resol-type alkylphenol resin.

BRIEF DESCRIPTION OF THE DRAWINGS

The present invention will be better understood from the description set forth below with reference to the accompanying drawings, wherein.

BEST MODE FOR CARRYING OUT THE INVENTION

According to the present invention, by providing a run flat tire wheel assembly having a run flat support formed by a high rigidity metal shell and rubbery elastic members wherein the rubbery elastic members are made from a rubber composition including 100 parts by weight of a diene-based rubber, 40 to 90 parts by weight of carbon black, 3 to 8 parts by weight of sulfur, 0.1 to 1 part by weight of an organic acid cobalt salt in terms of content of cobalt element, 0.1 to 3 parts by weight of a phenylene diamine-based antiaging agent, and 1 to 6 parts by weight of a resol-type alkylphenol resin, a tire wheel assembly improved in bondability with the ring-shaped metal shell is obtained. More preferably, by securing the predetermined bonding area, it is possible to impart to the run flat support a bonding strength able to sufficiently withstand the load at the time of attachment to the rim or run flat running.

It must be noted that as used herein and in the appended claims, the singular forms "a", "an", and "the" include plural reference unless the context clearly dictates otherwise.

The present invention will now be explained in detail by the embodiments shown in the figures.

Figure 1:
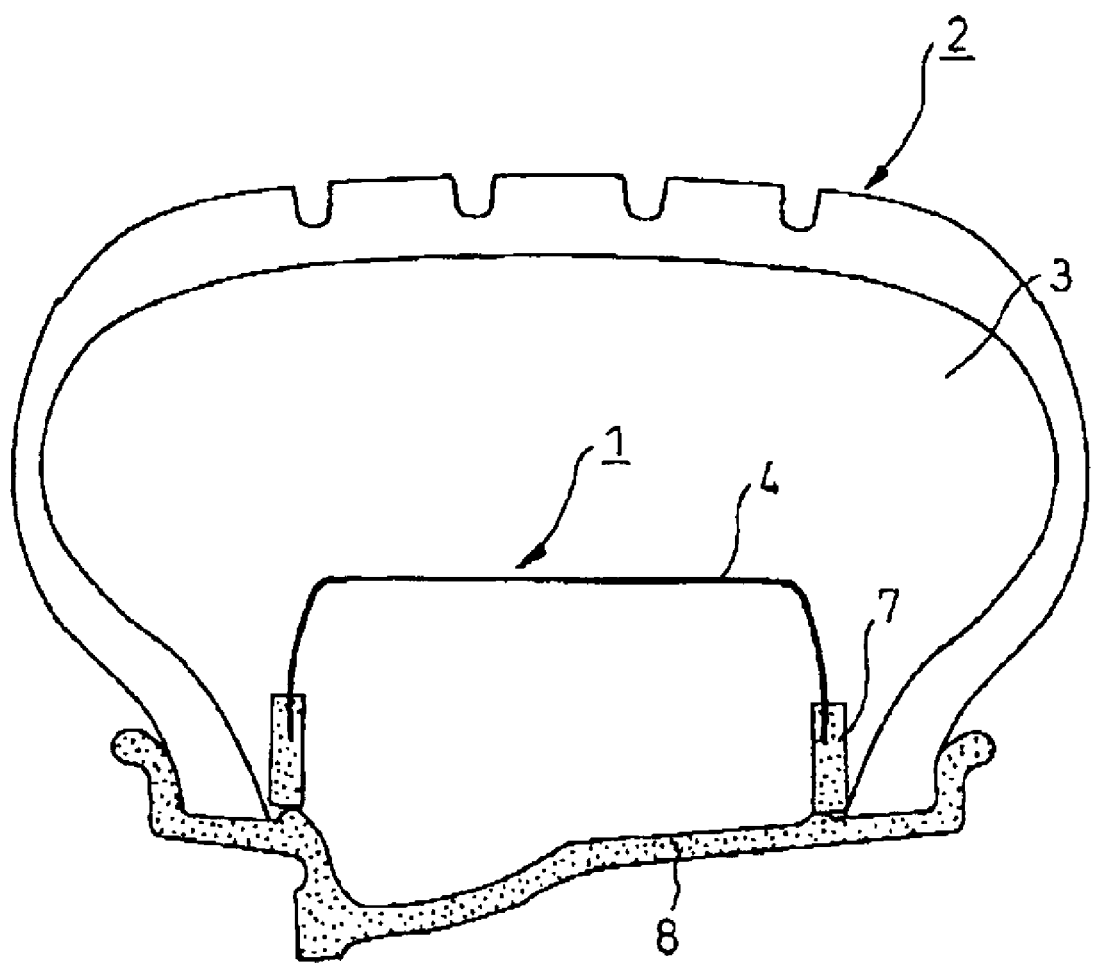
FIG. 1 is a sectional view along the meridional direction of principal parts of an embodiment of a tire wheel assembly of the present invention.
Figure 2:
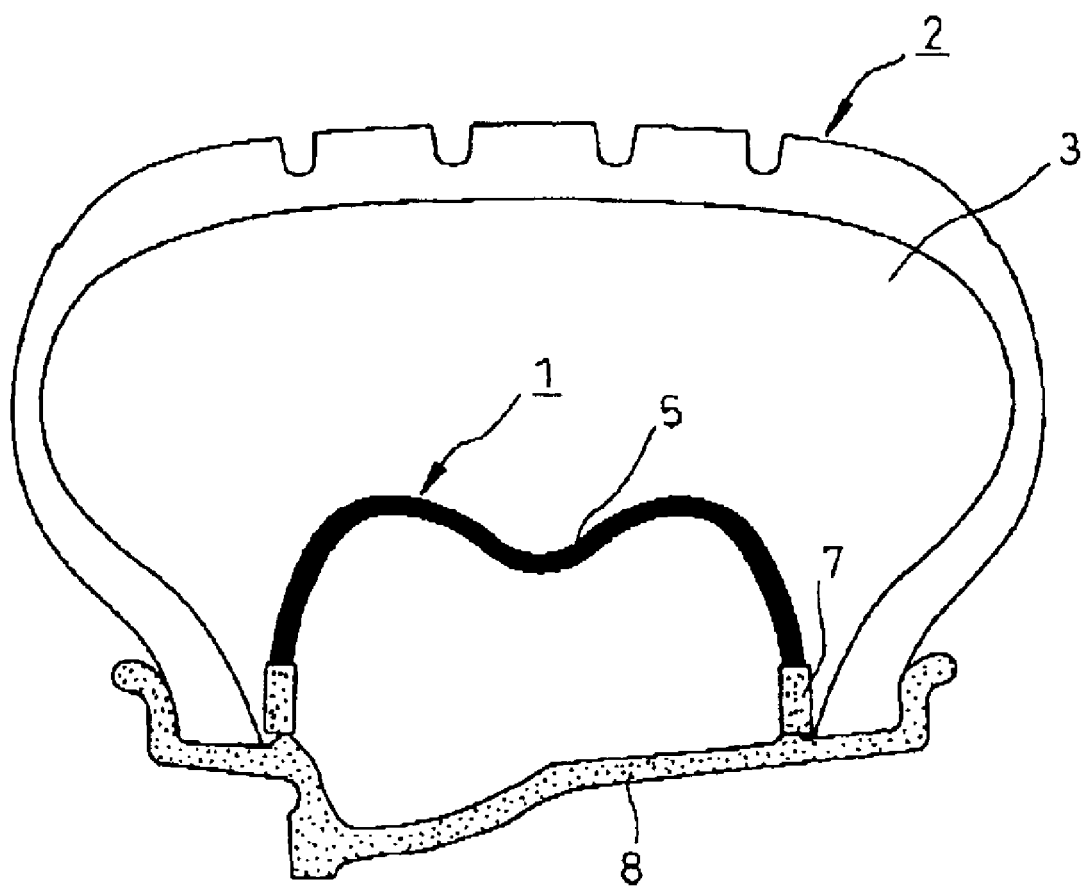
FIG. 2 is a sectional view along the meridional direction of principal parts of another embodiment of a tire wheel assembly of the present invention.
Figure 3:
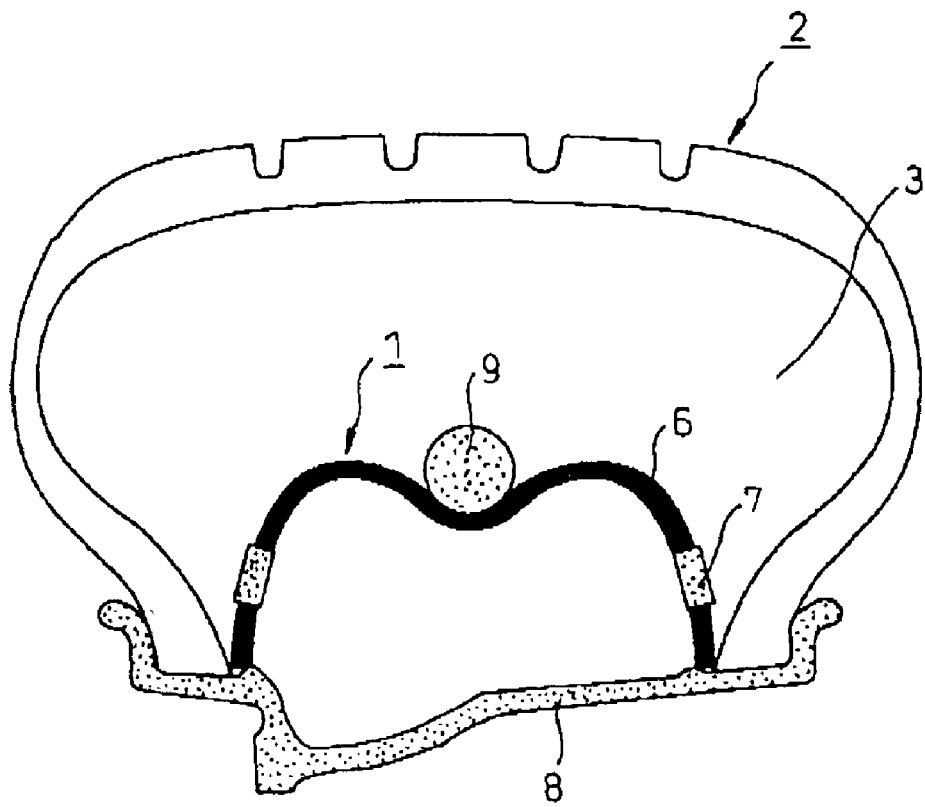
FIG. 3 is a sectional view along the meridional direction of principal parts of still another embodiment of a tire wheel assembly of the present invention.

FIG. 1, FIG. 2, and FIG. 3 are sectional views along the meridional direction showing principal parts of representative embodiments of a tire wheel assembly (i.e., wheel) of the present invention.

For example, as shown in FIG. 1, FIG. 2 and FIG. 3, the run flat support according to the present invention is formed from a ring-shaped metal shell 4, 5 or 6 and rubbery elastic members 7 inserted into a cavity 3 of a pneumatic tire 2. This run flat support 1 is formed with an outside diameter smaller than the inside diameter of the cavity 3 so as to maintain a fixed distance from the inside surfaces of the cavity 3 of the pneumatic tire 2 and is formed with an inside diameter of substantially the same dimensions as the inside diameter of the beads of the pneumatic tire. This run flat support 1 is assembled over the rim 8 of the wheel, together with the pneumatic tire 2, in the state inserted into the pneumatic tire 2, whereby the tire wheel assembly is formed. This tire wheel assembly is attached to an automobile etc. When the pneumatic tire becomes flat during running, the flat tire 2 is supported at the outer circumference of the run flat support 1, whereby run flat running becomes possible.

As explained above, the run flat support of the tire wheel assembly of the present invention is composed of a ring-shaped metal shell and rubbery elastic members, The ring-shaped metal shell 4, 5 or 6 forms a continuous support surface at the outside thereof for supporting a flat tire and forms left and right side walls as the legs at the inside thereof. The outside support surface can be made various shapes. For example, it may be made the flat shape as shown in FIG. 1, a shape where the horizontal sectional shape perpendicular to the circumferential direction is curved outward as shown in FIG. 2 (Note: the number of outward curves in the tire axial direction may be two as shown in FIG. 2 or three or more or even one), a shape composed of two or more outwardly curved surfaces with a circular-section elastic ring 9 arranged in the recess to impart a shock buffering capability at the time of run flat running and/or with the ring-shaped metal shell separated by rubbery elastic members, with the side walls of the metal shell directly abutting against the rim, and, thus, with a stable state of engagement maintained as shown in FIG. 3, etc. Even if forming the support surface in this way, if improving the bonding between the metal and the rubbery elastic members according to the present invention, the sustained run flat running distance of the tire can be extended.

The rubbery elastic members are attached to the ends of the two legs of the ring-shaped metal shell (see FIG. 1 or FIG. 2) or in the middle of the two legs (see FIG. 3) and support the ring-shaped metal shell by abutting against the rim at the left and right as they are. The rubbery elastic members are composed of rubber and buffer the shock or vibration received by the ring-shaped metal shell from the flat tire, act to stop slipping along the rim, and stably support the ring-shaped metal shell on the rim.

Figure 4:
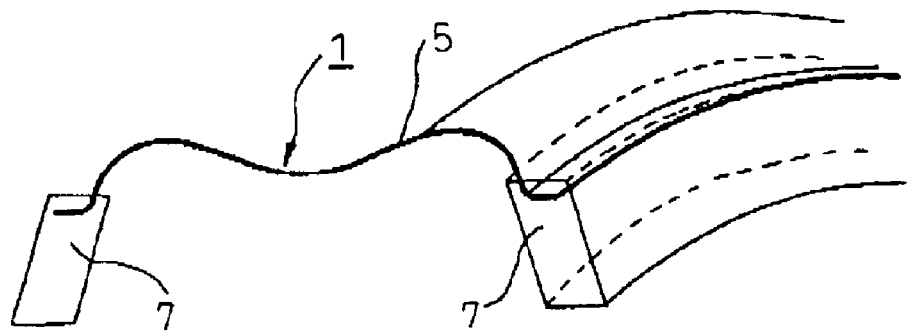
FIG. 4 is a sectional view of an example of bonded surfaces of the ring-shaped metal shell and rubbery elastic members of the tire wheel assembly of the present invention.

As shown in FIG. 4, the ring-shaped metal shell 5 and the rubbery elastic members 7 forming the run flat support 1 have a strong bonding strength, but a predetermined bonding area is preferably secured. The load at the time of rim work or run flat running is made dimensionless by the rim radius R (inches), When the bonding area is S (cm$^2$), the ratio S/R should be at least 4.5 cm$^2$/inch, preferably 8 to 20 cm$^2$/inch. Here, the "bonding area" means the bonding area between the metal and the rubbery elastic member at one side of the ring-shaped metal shell, that is, the total bonding area in the entire circumferential direction of the front/rear sides and the end face of the metal shell, where the end of the ring-shaped metal shell contacts the rubbery elastic member in the horizontal cross-section perpendicular to the circumferential direction.

Further, the bonding surfaces of the ring-shaped metal shell 5 and the rubbery elastic members 7 should be formed in the axial direction and the radial direction. It is more preferable that the two be substantially equal. By this, a structure is formed withstanding both force in the axial direction and radial direction occurring during run flat running.

In FIGS. 1, 2, and 3, the run flat support 1, the pneumatic tire 2 and the rim 8 are formed in ring shapes coaxially about the shaft of the wheel (not shown). Note that the dimensions of the metal shell are not particularly limited, but the thickness is preferably 0.5 to 3.0 mm and the width is approximately equal to the spacing between the left and right tire bead toes.

The tire wheel assembly of the present invention forms the ring-shaped metal shell 4, 5 or 6 from a metal material so as to support the weight of the automobile etc. through the flat tire. As such a metal, iron, stainless steel, aluminum alloy, etc. may be mentioned.

In the present invention, the rubbery elastic members are those which stably support the ring-shaped metal shell and improve the bondability with the ring-shaped metal shell and can be formed from a high sulfur-containing diene-based rubber. As the diene-based rubber used in the present invention, natural rubber (NR), polyisoprene rubber (IR), styrene-butadiene copolymer rubber (SBR), polybutadiene rubber (BR), etc. may be mentioned.

In the present invention, to improve the bondability between the ring-shaped metal shell and the rubbery elastic members, the rubbery elastic members are made from a rubber composition comprising, based upon 100 parts by weight of a diene-based rubber, 3 to 8 parts by weight, preferably 4 to 6 parts by weight, of sulfur and 0.1 to 1 part by weight, preferably 0.2 to 0.4 part by weight, of an organic acid cobalt salt in terms of content of the cobalt element and 1 to 6 parts by weight, preferably 2 to 5 parts by weight, of a resol-type alkylphenol resin. If the amount of the sulfur blended is too small, the desired bondability cannot be obtained, while conversely if too large, the physical properties after aging is decreased. The organic acid cobalt salt used is cobalt naphthenate, cobalt boro-neodecanoate, cobalt resinate, etc. If the content of cobalt is less than 0.1 part by weight, the bonding is not sufficient, while if adding an amount more than 1 part by weight, the decrease in the rubber properties after heat aging undesirably becomes remarkable. If the amount of the resol-type alkylphenol resin is less than 1 part by weight, the bonding is not sufficient, while if adding an amount more than 6 parts by weight, scorching occurs. Further, the rubber composition of the present invention can contain other additives generally used for rubber compositions in the past so long as the object of the present invention is not contravened.

The rubber composition used in the present invention may contain, in addition to the essential ingredients, a vulcanization agent, a vulcanization accelerator, various types of oil, an antioxidant, a softener, a plasticizer, and other various compounding agents blended into rubber for tires or other general rubber. The compounding agents are mixed and the mixture vulcanized by general methods to obtain a rubber composition which may then be used for vulcanization. The amounts of the compounding agents may also be general amounts used in the past so far as the object of the present invention is not adversely affected. The production of the tire wheel assembly may be based upon any conventional general methods.

EXAMPLES

The present invention will now be explained further by Examples and Comparative Examples, but, of course, the technical scope of the present invention is not limited by these Examples.

Examples 1 to 3 and Comparative Example 1

The effects of the present invention will be attested to using the rubbery elastic members from the rubber compositions of the formulations (parts by weight) shown in Table I.

Next, rubbery elastic member samples of the formulations (parts by weight) shown in Table I (dimensions: 5.5 mm thick×2.5 cm wide×8 cm long) were prepared, with the exception of the sulfur and vulcanization accelerator, first mixing the ingredients by a Bambury mixer until a temperature of 150° C., then adding the sulfur and vulcanization accelerator and mixing at 80° C. for 3 minutes, then plates made of iron were bonded thereto by heating at 150° C. for 60 minutes. The results are shown in Table I.

TABLE I

|  |  | Comp. Ex. 1 | Ex. 1 | Ex. 2 | Ex. 3 |
|---|---|---|---|---|---|
| NR[1] |  | 100 | 100 | 100 | 100 |
| HAF carbon |  | 70 | 70 | 70 | 70 |
| Cobalt naphthenate[2] |  | 0.5 | 2 | 3 | 4 |
| (containing cobalt element) |  | (0.05) | (0.2) | (0.3) | (0.4) |
| Sulfur |  | 1 | 4 | 6 | 8 |
| Phenylene diamine-based antioxidant[3] |  | 0.5 | 0.5 | 0.5 | 0.5 |
| Alkylphenol resin[4] |  | 0 | 2 | 4 | 5 |
| Initial bonding | Peeling force | 100 | 125 | 147 | 181 |
|  | Rubber coverage (%) | 30 | 70 | 100 | 100 |
| Bonding after heat aging (note) | Peeling force | 100 | 300 | 100 | 350 |
|  | Rubber coverage (%) | 0 | 30 | 80 | 100 |

(Note)
Heat aging is value after degradation under conditions of 80° C. × 1 week.
Notes of Table I
[1]NR: natural rubber (RSS#3)
[2]Cobalt naphthenate: Cobalt naphthenate (Co content 10%) made by Dainippon Ink & Chemicals
[3]Phenylene diamine-based antioxidant: Santoflex 6PPD, made by Flexsys
[4]Alkylphenol resin: Hitanol 2501Y, made by Hitachi Chemical The test methods for the physical properties evaluated were as follows:

Peeling force: Measured based on JIS K6256 Test Methods for Bonding of Vulcanized Rubber and Thermoplastic Rubber. Indexed to value of Comparative Example 1 as 100. The larger the value, the better the bonding indicated.

Rubber coverage (%): Shows coverage by rubber of surface of base plate after peeling. No rubber coverage at all indicated as 0% and complete coverage by rubber as 100%.

As shown in Table I, according to the present invention, it is observed that by blending a specific amount of an organic acid cobalt salt, sulfur, resol-type alkylphenol resin, carbon, and a phenylene diamine-based antioxidant into a diene-based rubber, the coverage of rubber on the surface of the base plate is excellent and the peeling force becomes stronger.

Examples 4 to 6 and Comparative Example 2

Tire wheel assemblies of the present invention (i.e., Examples 4 to 6) and a conventional tire wheel assembly (i.e., Comparative Example 2) using Comparative Example 1 were prepared using as tire sizes 205/55R16, 89V and rim sizes 16×6½ JJ.

These tire wheel assemblies were evaluated and tested for durability by the measurement method shown below. The results are shown in Table II.

DURABILITY TEST

The test tires were attached to a 2500 cc passenger car. The front right side tire was filled to an internal air pressure of 0 kPa and the other three tires to an internal air pressure of 200 kPa. The car was run at 90 km/hr until breaking down. The results are indexed to the value of Comparative Example 2 as 100. The larger the value, the better the durability indicated.

TABLE II

|  |  | Examples | | |
|---|---|---|---|---|
|  | Comp. Ex. 2 | 4 | 5 | 6 |
| Durability | 100 | 118 | 122 | 127 |

Notes of Table II
Example 4: Rubber composition according to Example 1 used.
Example 5: Rubber composition according to Example 2 used.
Example 6: Rubber composition according to Example 3 used.

From the results of Table II, it is observed that the tire wheel assembly of the present invention can be improved in durability.

As explained above, bonding of metals such as iron, stainless steel, which are poor in bondability with rubber alone and rubbery elastic members is extremely difficult. Even if made to bond, the bond has been insufficient strength-wise or poor in durability over time in most cases. However, according to the present invention by forming the rubbery elastic members from a rubber composition including, based on 100 parts by weight of a diene-based rubber, 3 to 8 parts by weight of sulfur, 0.01 to 0.1 part by weight of an organic acid cobalt salt in terms of content of a cobalt element, 0.01 to 3 parts by weight of a phenylene diamine-based antioxidant, and 1 to 6 parts by weight of a resol-type alkylphenol resin, the bondability between the ring-shaped metal shell and the rubbery elastic members is improved and the durability as a run flat support is greatly enhanced.

What is claimed is:

1. A run flat tire wheel assembly having a flat run support formed by a ring-shaped metal shell and rubbery elastic members in a tire/rim cavity, wherein the bonding between the ring-shaped metal shell and the rubbery elastic members of the tire wheel assembly is improved by the rubbery elastic members composed of a rubber composition comprising 100 parts by weight of a diene-based rubber, 40 to 90 parts by weight of carbon black, 3 to 8 parts by weight of sulfur, 0.1 to 1 part by weight of an organic acid cobalt salt in terms of content of a cobalt element, 0.1 to 3 parts by weight of a phenylene diamine-based antioxidant and 1 to 6 parts by weight of a resol-type alkylphenol resin.

2. A tire wheel assembly as claimed in claim 1, wherein the rubbery elastic-members of the run flat support are arranged between the ring-shaped metal shell and the rim and are structured to support the ring-shaped metal shell.

3. A tire wheel assembly as claimed in claim 1, wherein, when a nominal size of the tire is R (inch) and a bonding area of the rubbery elastic members and the metal is S ($cm^2$), the ratio S/R is at least 4.5 $cm^2$/inch.

4. A tire wheel assembly as claimed in claim 1, wherein the bonding surfaces are formed by the substantially axial direction surfaces and substantially radial direction surfaces.

* * * * *